Figure 1:
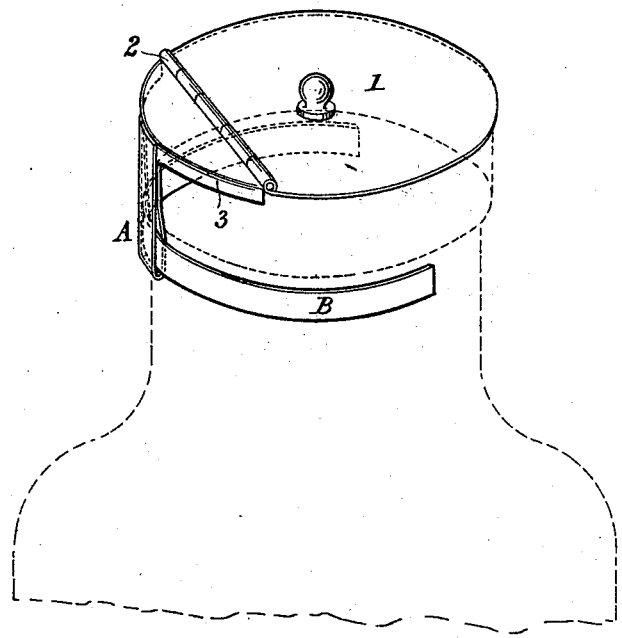
Figure 2:
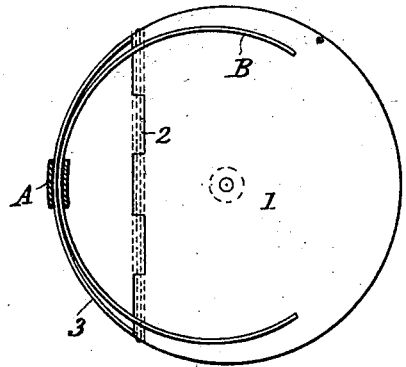

(No Model.)

F. J. MOCKLER.
REMOVABLE SPRING COVER FOR CUPS, JUGS, &c.

No. 511,538. Patented Dec. 26, 1893.

Witnesses:
Raphael Netter
M. C. Pinckney

Inventor
Frederick J. Mockler
by J. E. M. Bowen
Attorney.

UNITED STATES PATENT OFFICE.

FREDERICK JAMES MOCKLER, OF WOTTON-UNDER-EDGE, ENGLAND.

REMOVABLE SPRING-COVER FOR CUPS, JUGS, &c.

SPECIFICATION forming part of Letters Patent No. 511,538, dated December 26, 1893.

Application filed April 29, 1892. Serial No. 431,195. (No model.) Patented in England December 1, 1891, No. 20,911.

*To all whom it may concern:*

Be it known that I, FREDERICK JAMES MOCKLER, manager of the County of Gloucester Bank, of Wotton-under-Edge, Gloucestershire, England, have invented certain new and useful Improvements in Removable Spring-Covers for Cups, Jugs, and other Vessels, (for which I have obtained Letters Patent of Great Britain, No. 20,911, dated December 1, 1891;) and I do hereby declare that the following is a full, clear, and exact description of the same.

My invention relates to covers for cups, jugs and other vessels, and it has for its object the devising of a cover which may be readily removed whenever desired for the purpose of washing the utensil, for example. The cover being removably attached to the utensil it may therefore be used with any one of a variety of vessels to which its configuration adapts it.

The invention is illustrated in the accompanying drawing, which forms a part of this specification and which shows my improved cover in perspective.

Referring to the drawing, 1 indicates the cover hinged at 2 to a base piece 3 which is adapted to fit snugly onto the edge of the receptacle, generally in close proximity to the handle of the vessel, when the vessel is provided with a handle, as will be readily understood. A indicates a loop depending from said base piece 3, and rigidly connected thereto and preferably of the same material as the base piece.

B shows a spring consisting of a metal band of the requisite curve and rigidity which passes through the loop A, is removable therefrom, said spring B being adapted to clasp the utensil to which the cover is applied and thus hold said cover in place.

The object of making the connection between the cover and the spring band, B, in the form of a loop is that in case the spring band should be broken it may be readily replaced by another—and also in packing the covers in large quantities the spring band may be withdrawn from the loop and packed separately. This mode of removably holding the cover in place on the vessel by means of a spring passing through a loop attached to the hinged cover, is new with me and it enables the cover to be removed at will in order to clean the utensil, and also adapts the cover to be utilized on any vessel to which its peculiar configuration may suit it.

The part A of the cover may be made of material different from the base part 3, the latter being preferably metal; and the parts 3 and A may be formed integral and considered the base-section of the structure to which the spring B may be removably connected in any suitable manner.

Having thus described my invention, what I claim as new, and desire to secure by Letters Patent, is—

1. A removable cover for jugs and the like having attached thereto a depending loop, as A, combined with a spring band, as B, removably connected to said loop, substantially as set forth.

2. The combination with cover 1 and base-piece 3, provided with depending loop A and hinged to cover 1 as at 2, of spring band B, removably connected to said loop A, substantially as set forth.

Signed at Wotton-under-Edge, Gloucestershire, England, this 11th day of April, 1892.

FREDERICK JAMES MOCKLER.

Witnesses:
   WM. HEATH,
*The Chipping, Wotton-under-Edge, Glos., Genln.*
   HARRIOT B. HARRIS,
*Widow, Wotton-under-Edge.*